(12) United States Patent
Hariharan et al.

(10) Patent No.: US 9,037,501 B1
(45) Date of Patent: *May 19, 2015

(54) PRESENTING ALTERNATIVE SHOPPING OPTIONS

(71) Applicant: Amazon Technologies, Inc., Reno, NV (US)

(72) Inventors: Gurushyam Hariharan, Phoenix, AZ (US); Hidayet Ozgur Sanli, Tempe, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/103,148

(22) Filed: Dec. 11, 2013

Related U.S. Application Data

(63) Continuation of application No. 12/561,427, filed on Sep. 17, 2009, now Pat. No. 8,635,119.

(51) Int. Cl.
*G06Q 30/00* (2012.01)
*G06Q 30/06* (2012.01)

(52) U.S. Cl.
CPC ........ *G06Q 30/0631* (2013.01); *G06Q 30/0629* (2013.01); *G06Q 30/0633* (2013.01)

(58) Field of Classification Search
CPC .................................. G06Q 30/0601–30/0645
USPC ................................................. 705/26.1–27.2
See application file for complete search history.

(56) References Cited

U.S. PATENT DOCUMENTS

| | | | |
|---|---|---|---|
| 2001/0021914 A1* | 9/2001 | Jacobi et al. | 705/8 |
| 2006/0080297 A1* | 4/2006 | Barth | 707/3 |
| 2007/0073587 A1* | 3/2007 | Walker et al. | 705/14 |

OTHER PUBLICATIONS

Pattinson, H., & Brown, L. (1996). Chameleons in marketspace industry transformation in the new electronic marketing environment. Journal of Marketing Practice, 2(1), 7-21.*
Rosenbaum, D. (2000), An imperfect world, CIO Canada, 8(1), 12.

* cited by examiner

*Primary Examiner* — Resha Desai
(74) *Attorney, Agent, or Firm* — Thomas | Horstemeyer, LLP

(57) ABSTRACT

Disclosed are various embodiments for presenting alternative shopping options to a customer. A collection of alternative shopping options is identified in a computing device based upon subject matter of a network page generated by a first one of a plurality of network sites to be presented to a customer. Each of the network sites is configured to sell a plurality of products, and at least one of the alternative shopping options comprises a purchase opportunity associated with a second one of the network sites. An estimate of a benefit for each of the alternative shopping options is determined with respect to the first one of the network sites, and a subset of the alternative shopping options is identified to be included in the network page based at least upon the estimates. The subset of the alternative shopping options is included in the first network page.

20 Claims, 4 Drawing Sheets

PRESENTING ALTERNATIVE SHOPPING OPTIONS

CROSS REFERENCE TO RELATED APPLICATIONS/INCORPORATION BY REFERENCE

This application is a continuation of U.S. application Ser. No. 12/561,427 titled "Presenting Alternative Shopping Options," filed Sep. 17, 2009, which is incorporated herein by reference in its entirety.

BACKGROUND

Commercial websites and the like can benefit each other by collaborating to provide for cross-traffic between sites. However, in doing so, the opportunities to promote cross-traffic from one site to the next may be quite numerous and would quickly overwhelm a customer if all possible cross-traffic opportunities were actually presented to the customer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The following discussion describes systems and methods relating to collaborative electronic commerce between network sites in the context of an online marketplace or other context according to various embodiments. In one embodiment, a customer may search for a product at a first network site. Based on data from multiple network sites obtained over time, the first network site may generate a network page in response to a search by a user that includes a reference to one or more second network sites. For the sake of convenience, first a data communications network is described, followed by a discussion of the operation of the various components of the data communications network according to various embodiments.

Figure 1:
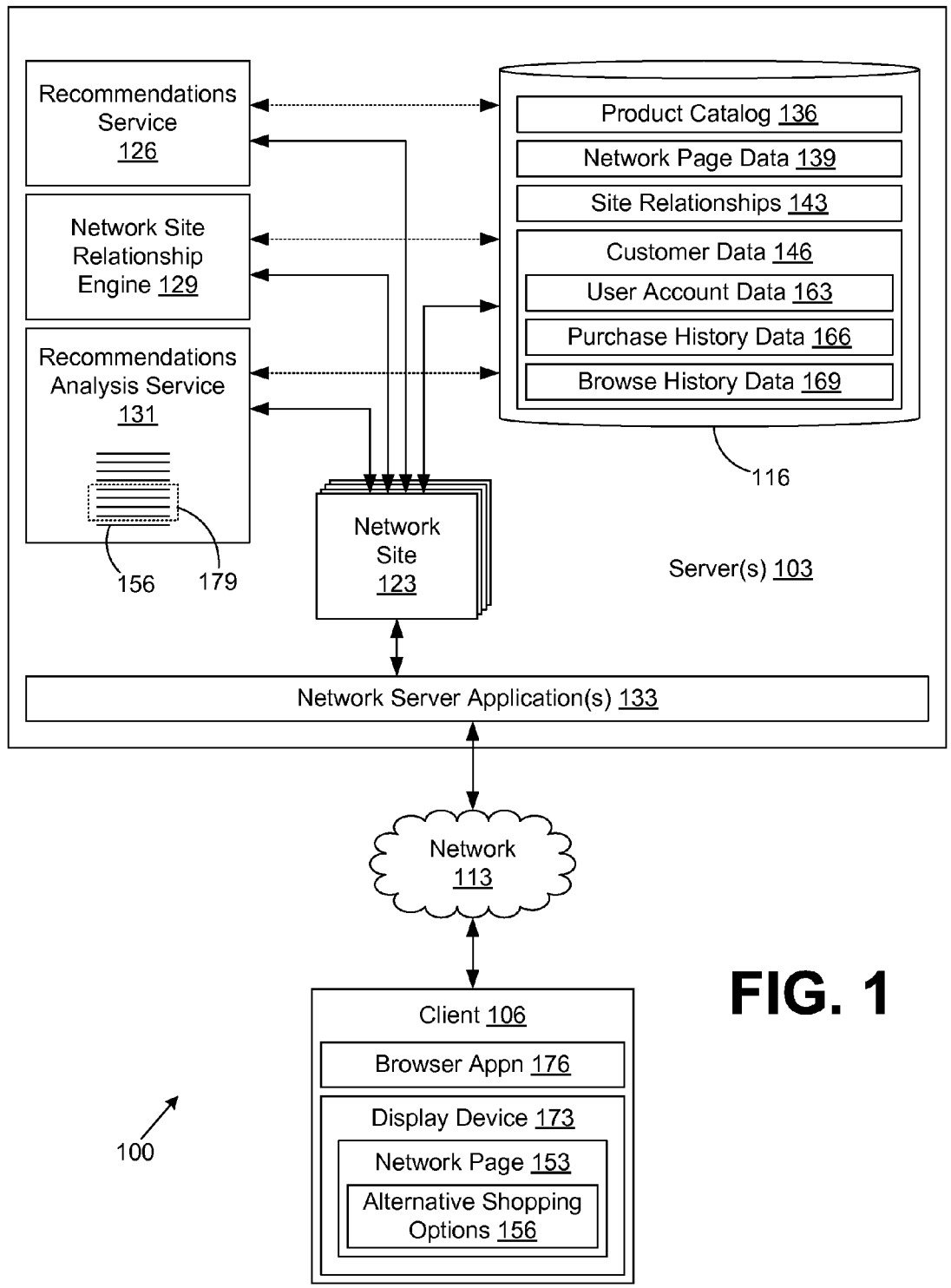
FIG. 1 is a drawing of a data communications network according to an embodiment of the present disclosure.

With reference to FIG. 1, shown is an example of a data communications network 100 that includes various computing resources or devices such as one or more servers 103 and one or more clients 106 that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, the one or more servers 103 and the one or more clients 106 are referred to herein in the singular. However, it is understood that in one embodiment, the server 103 may represent a plurality of servers, and the client 106 may represent a plurality of clients.

Each of the servers 103 comprises one example of a computing resource that may be employed to execute various components as described herein. Each of the servers 103 may comprise, for example, a server computer or like system, and may represent multiple servers arranged, for example, in one or more server banks or other arrangements. Such servers may be located in a single installation or may be dispersed among many different geographical locations. To this end, each of the servers 103 may be viewed as a computing resource comprising a server "cloud," for example, that represents the computing capacity of multiple servers, etc.

Various applications, services, engines, and/or other functionality are executed in the server 103 according to various embodiments. Also, various data is stored in one or more data store(s) represented by data store 116 that is accessible to the server 103. The data stored in the data store 116, for example, may be associated with the operation of the various applications, services, engines, and/or functional entities described below. The components executed on the server 103, for example, include one or more network sites 123, a recommendations service 126, a network site relationship engine 129, a recommendations analysis service 131, a network server application 133, and other applications, services, engines, or functionality not discussed in detail herein.

The network server application 133 may comprise, for example, web servers or other types of network server applications 133 that provide browser access or other appropriate types of access to the network sites 123 and other components implemented in the server 103 to clients 106 and the like using various protocols such as the Transmission Control Protocol/Internet Protocol (TCP/IP). To this end, the network server application 133 may comprise multiple component applications as can be appreciated.

Each of the network sites 123 is configured to conduct electronic commerce to facilitate the network presence of one or more online merchants. To this end, each of the network sites 123 may comprise one or more component applications, services, engines, or other functional entities. Although the network sites 123 are shown as implemented in the server 103, it may be the case that the network sites 123 are implemented in multiple different servers operated by multiple entities. The components making up each of the network sites 123 provide for various functions such as maintaining a product catalog, searching for products, generating network pages with search results or for other purposes, effecting payment for products, and other functions. The products sold through a network site 123 may comprise, for example, goods and/or services.

To this end, the data store 116 includes, for example, a product catalog 136 in which data about products sold through one or more network sites 123 is stored. In addition, various network page data 139, site relationships 143, and customer data 146 are stored in the data store 116. The network page data 139 includes data that is used to create network pages 153 that are served up to a client 106 by the respective network sites 123 to be rendered on the client 106. Such network pages 153 may be static or may be created dynamically as can be appreciated.

According to one embodiment, a group of alternative shopping options 156 may be presented as a portion of a network page 153. An alternative shopping option 156 may comprise a recommendation to purchase a different product based upon the subject matter of the network page 153. For example, such subject matter may comprise the details about a product to be displayed in the network page 153. Such a product may be offered by the current network site 123 that generated the network page 153 or by another network site 123. Alternatively, an alternative shopping option 156 may comprise a reference or link to another network site 123 that may be related in some way to the subject matter of a given network page 153. For example, where the subject matter of a given network page 153 includes the product details of a specific product, the reference or link may be to another network site 123 that specializes in products like the one viewed as will be described.

The site relationships 143 include data that indicates relationships between a product, category of products, brand, or other data associated with a first network site 123, and one or more second network sites 123 as will be described. Further, a site relationship 143 may be identified, for example, between a product offered on a first network site 123 and a second network site 123 itself by virtue of the fact that users that view or purchase the product offered on a first network site 123 also view products on a given second network site 123.

To this end, some of the network sites 123 may focus on selling narrow lines of products and may present network pages 153 that are designed to enhance the sales of such products. For example, a given network site 123 may specialize in the sale of specific products such as video games, furniture, electronics, or other specialty. Given that such network sites 123 are specifically designed with a limited product selection in mind, it may be more likely that such network sites 123 will be successful in selling the specific products as compared to network sites 123 that sell a broad selection of products.

According to one embodiment, the customer data 146 includes data involving the transactions of users with multiple ones of the network sites 123. For example, the server 103 may be operated by a single entity that facilitates an electronic marketplace of multiple different network sites 123. Such an entity can examine the purchase history data 166 and browse history data 169 from multiple network sites 123 to identify site relationships 143. A site relationship 143 may comprise, for example, the fact that customers who view product X on one network site 123 typically view a second network site 123 during the same session. Also, based on the customer data 146, it may be determined that customers may be more likely to purchase product X when it is viewed on a second network site 123 as opposed to a first network site 123.

In some situations, each of the network sites 123 may be operated by a single entity. This entity can provide for a global shopping cart service that is employed when visiting the several different network sites 123 and purchases can be made from several different network sites 123 at the same time using the same shopping cart and checkout process. In other situations, shopping carts may be associated with each individual network site 123, where the customer data 146 is stored in a central data store 116. The site relationships 143 may be stored in a table or other data structure.

The customer data 146 includes user account data 163, purchase history data 166, and browse history data 169. As will be described, the customer data 146 may be examined to identify the site relationships 143 mentioned above.

The client 106 is representative of a plurality of client devices that may be coupled to the network 113. For example, the client 106 may comprise one of millions of clients 106 coupled to the Internet. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 173, indicator lights, speakers, etc. The display device 173 may comprise, for example, cathode ray tubes (CRTs), liquid crystal display (LCD) screens, gas plasma-based flat panel displays, LCD projectors, or other types of display devices, etc.

Executed within the client 106 are various applications including a browser application 176. The client browser application 176 is configured to interact with the network sites 123 and potentially other applications on the server 103 through the network server application 133 according to an appropriate protocol such as the Internet Protocol Suite comprising Transmission Control Protocol/Internet Protocol (TCP/IP) or other protocols. To this end, the browser application 176 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 176 may comprise some other application with like capability. When executed in the client 106, the browser application 176 renders network pages 153 on the display device 173.

One or more network sites 123 may also be executed on other services 109 where the data associated with such a network site 123 is maintained on the server 103 in the data store 116, or a data feed is established to communicate the data from a remote location to the server 103 to be stored in the data store 116. Alternatively, data such as customer data 146 may be provided to the server 103 for storage in the data store 116 from a tracking application in the browser application 176, etc. Thus, the ultimate customer data 146 from which site relationships 143 are determined can be generated by network sites 123 operated or hosted on the server 103 or external servers, or received from clients 106.

As described above, various customer data 146 is stored in one or more data stores 116 on the server 103. Such information includes purchase history data 166, browse history data 169, and other data associated with respective customers. The purchase history data 166 details the purchases made by users through various network sites 123. The browse history data 169 details the behavior of users in viewing various products and searching for various products during sessions on one or more network sites 123.

In order to determine the site relationships 143, in one embodiment, the user account data 163 is associated with the purchase history data 166 and the browse history data 169 so that the behavior of a given customer may be examined from among multiple network sites 123. Stated another way, regardless of where the customer data 146 is obtained, a customer should be associated with such data in some manner so that relationships can be determined based on the behavior of a single customer. Specifically, once a customer is associated with all purchase history data 166 and browse history data 169, regardless of the origin of such data, then the behavior of the customer can be traced during various sessions in order to identify potential affinities between various aspects of a first one of the network sites 123 and a second one of the network sites 123. Ultimately, the site relationships 143 may be identified based on the common behavior of multiple customers. In one embodiment, a site relationship 143 is identified based on the common behavior of a threshold number of customers.

Given that all of the customer data 146 is stored in the data store 116 accessible to the server 103, the network site relationship engine 129 may be executed in order to identify site relationships 143 therefrom. According to various embodiments, the site relationships 143 generally comprise an affinity between some subject matter of a network page 153 generated by a first one of the network sites 123, and a second one of the network sites 123. The subject matter may comprise, for example, a product offered for sale, categories of products indicated, brands of products indicated, or other subject matter in a network page 153 generated by the first one of the network sites 123.

For example, one relationship might be that customers who have purchased or viewed item X in a network page 153 generated by a first one of the network sites 123 also have contemporaneously viewed one or more network pages 153 of a second one of the network sites 123. In this respect, the term "contemporaneously" may mean that the actions took place during the same session or within a short period of time relative to each other so as to indicate a relationship or affinity. If a threshold number of customers engage in this specific browsing activity, then it may be deemed that there is a relationship between the item X and the second one of the network sites 123.

In another example, a relationship might be that customers who view a product category indicated on a network page 153 generated by a first one of the network sites 123 also contemporaneously visit a second one of the network sites 123. A product category may be viewed by browsing a network page 153 for a product category that lists products falling under a specific category for a given one of the network sites 123. If a threshold number of customers engage in this specific browsing activity, then it may be deemed that there is a relationship between the second one of the network sites 123 and a category associated with the first one of the network pages 153. Such may be the case where the second one of the network sites 123 might specifically focus on selling products within the given category. To this end, a customer may view products in a given category from a general merchant and may also visit a second network site 123 that specializes in selling products that fall within the category while shopping for a product that falls under the given category.

In still another example, a relationship might be that a brand name or other term used in a search that appears in a network page 153 generated by a first one of the network sites 123 is associated with one or more second network sites 123, for example, that may specialize in such a brand or products. For example, assume that the brand name "WIDGETS" was included in a search string of a search performed through a first one of the network sites 123. Presumably, such a search term appears in the search results network page 153. Also, assume that a second one of the network sites 123 is a specialized boutique that specifically sells WIDGETS brand products. Accordingly, a site relationship 143 may exist between the brand as indicated in the network page 153 from the first one of the network sites 123 and the second one of the network sites 123.

In addition, a relationship may exist between a given product and a given network site 123 by virtue of a relatively high conversion rate for the product on the respective network site 123. One may identify conversion rates for specific products on different network sites 123 to identify those network sites 123 with the greatest probability of conversion for a given product. It is presumed that a conversion rate may be attributable to the nature of the network site 123. The concept of conversion as contemplated herein may encompass the actual purchase of a product viewed, adding a product to a shopping cart, clicking through an advertisement or other reference, clicking through a link, or some other behavior.

Still further, a relationship may exist between a product offered by a first network site 123 and a second network site 123 by virtue of the fact that the product is related in some way to one or more products available on the second network site 123. Such a relationship may comprise, for example, a complementary relationship, a comparison relationship, or other type of relationship. A complementary relationship is one in which products are not competing products, but are related to each other in some way such that it makes sense to purchase both. In this sense, one product may be needed in order to use the other product, or one product may provide help in using the other product. For example, a complementary relationship may exist where an electronic device offered for sale on a first network site 123 is compatible with a power cord offered on a second network site 123. In another example, a complementary relationship may exist where a device is offered for sale on a first network site 123 and a book that explains how to use the device is offered for sale on a second network site 123. Also, a complementary relationship may exist where two or more items have a purchase affinity with each other even in cases where no other apparent relationship exists. For example, it may be the case that customers who purchase product X also tend to purchase product Y. A comparison relationship may exist where a second network site 123 offers devices that are alternatives to a device offered for sale through a first network site 123. Such comparative products may be like products offered by competitors.

In addition, various data mining techniques may be employed to identify relationships between various items. For example, affiliations between products may be determined based on the behavior of customers as set forth by the customer data 146. Specifically, it may be determined that a predefined percentage of customers who purchase item X also purchase item Y. If this predefined percentage is significant, then it may be assumed that a relationship exists between items X and Y. In addition, there may be many other approaches that can be employed to determine relationships between products.

In addition, there may be many other types of relationships between the subject matter of a network page 153 generated by a first network site 123 and a second network site 123 beyond those described above.

Once the network site relationship engine 129 identifies specific site relationships 143, they may be stored in the data store 116 as shown. In one embodiment, each network site 123 may include its own set of site relationships 143 with respect to other network sites 123. Thus, the site relationships 143 may be specifically generated for a given network site 123 relative to other network sites 123. By virtue of the fact that the site relationships 143 are stored in the data store 116, they may be accessed quickly for use in generating a given network page 153 by a respective one of the network sites 123. Alternatively, it may be the case that the site relationships 143 are not stored in the data store 116, but are generated on the fly by the network site relationship engine 129 in response to a request from a network site 123.

According to various embodiments, each of the network sites 123 generates various types of network pages 153 in accordance with the electronic commerce they facilitate.

Such different network pages 153 may include, for example, a network page 153 that specifically sets forth the details associated with a given product called a "product detail" network page 153. Such a network page 153 often gives a customer an opportunity to select such a product for inclusion within a shopping cart.

Another type of network page 153 that may be generated by a network site 123 may set forth a product category. Such a network page 153 may limit the products viewed by a customer to those that fall within a given category. The category may be defined by the network site 123 itself such as might be the case with a taxonomy associated with the network site 123. For example, a network page 153 depicting a product category might be associated with a link on a home page or other page that may be selected in an effort to narrow down the products viewed by a customer to those products falling within a given category.

Another type of network page 153 may be a product search page that lists the results of a product search performed by a customer on a network site 123. In one embodiment, the search terms employed may be relevant to other network sites 123 as will be described. In addition, there may be many other types of network pages 153 generated by respective network sites 123.

The recommendations service 126 is configured to provide purchase recommendations based upon the subject matter of a given network page 153 generated by a respective network site 123. For example, a given network site 123 may be in the process of generating a network page 153 that comprises a product detail network page 153 to present the details about a given product that a customer may wish to purchase. While the network site 123 is generating the given network page 153, it sends a request to the recommendations service 126 for product recommendations based upon data about the product to be displayed and based upon information about the respective customer.

In response, the recommendations service 126 generates product recommendations based upon data about the product to be displayed in the product detail network page 153 or based upon the customer data 146 associated with the user. To this end, the recommendations service 126 may use various algorithms to generate recommendations. For example, the recommendations service 126 may have determined that a significant percentage of customers who purchase product X also purchase product Y by examining the customer data 146 over time. The recommendations service 126 may be configured to find other affiliations or affinities between various products in order to generate a product recommendation. The product recommendations provided by the recommendations service 126 may recommend products that are also sold by the network site 123 that is requesting the recommendation from the recommendations service 126.

The recommendations service 126 may generate product recommendations for a given network site 123 based upon any information provided by the network site 123 relating to products or customer data 146. To this end, the type of network page 153 in which such recommendations are to be presented may be any type of network page 153 that is generated by a network site 123 to the extent that the network site 123 can provide information to the recommendations service 126 about the subject matter of the network page 153 from which recommendations can be generated. Thus, a product detail network page 153 is one example of the many different types of network pages 153 that may be generated by a network site 123 that would result in a request to the recommendations service 126 for product recommendations or other types of recommendations. Where a given network page 153 does not provide enough information for the generation of recommendations but a given customer may be identified, then the recommendations service 126 may generate product recommendations based upon the customer data 146 associated with such customer. Alternatively, product recommendations may be generated based upon both the subject matter of a network page 153 and the customer data 146 of an identified customer. Also, in generating recommendations, the recommendations engine may consult site relationships 143 and may examine customer data 146 of multiple customers to spot trends or other commercial intelligence.

Recommendations generated by the recommendations service 126 may present other products sold by a requesting network site 123 or products sold by another network site 123 as specified by the requesting network site 123. When each network site 123 proceeds to generate a given network page 153, the network site 123 may thus include recommendations for specific products sold by the network site 123 itself, or for products sold by other network sites 123 as requested from the recommendations service 126.

In addition, the network site 123 may request recommendations for any network site relationships 143 associated with the subject matter of the network page 153 from the network site relationship engine 129. In response to such a request, the network site relationship engine 129 may look up respective site relationships 143 that are relevant to the request and send the same back to the requesting network site 123. Such site relationships 143 may be presented to a customer in a network page 153 as a recommendation to visit such network site 123 as will be described.

According to one embodiment, a determination needs to be made as to which of the recommendations to present to a customer in a given network page 153 given the product recommendations received from the recommendations service 126 and given the recommendations associated with site relationships 143. In one embodiment, there may be limited space in a given network page 153 in order to present such recommendations, whether they be for products or for other network sites 123. Such recommendations comprise alternative shopping options 156 as described above.

According to one embodiment, the network site 123 may provide all potential alternative shopping options 156 to the recommendations analysis service 131 in order to identify a subset 179 of the total collection of possible alternative shopping options 156 that are to be presented in the network page 153. To do so, the network site 123 communicates the respective alternative shopping options 156 to the recommendations analysis service 131.

The recommendations analysis service 131 then proceeds to determine an estimate of a benefit of each of the alternative shopping options 156 with respect to the requesting network site 123. For example, the benefit for a given network site 123 may comprise differing levels of profitability depending upon the nature of the alternative shopping option 156. For example, if the alternative shopping option 156 comprises redirection to a different network site 123 to view a product sold by such network site 123, then it may be the case that the requesting network site 123 may only receive a commission payment for the referral. This commission payment may be received rather than a full profit margin for products that are sold directly by the requesting network site 123. According to one embodiment, a given network site 123 may present one or more network pages 153 that depict the benefits that a given merchant received by virtue of the alternative shopping options 156 that were included. Such a depiction may list all of the commissions paid or other revenue received after a user has clicked on a given alternative shopping option 156, etc.

There are various ways that one may determine an estimate of a benefit of each of the alternative shopping options 156 from the perspective of a requesting network site 123. To the extent that various approaches are described herein, they are discussed merely as examples. Assuming that an estimate of the benefit for each of the alternative shopping options 156 is determined, the recommendations analysis service 131 then proceeds to identify a subset 179 of the alternative shopping options 156 that are to be included in a given network page 153 generated by the requesting one of the network sites 123. Such a determination of the subset of alternative shopping options 156 may be identified based upon the estimated benefit obtained for each of the alternative shopping options 156.

The number of alternative shopping options 156 that are included in the subset 179 may be determined based upon the space available in the network page 153 generated by the requesting network site 123 for the alternative shopping options 156. To this end, a requesting network site 123 may provide the number of alternative shopping options 156 for which there is space within the network page 153 to inform the recommendations analysis service 131 how many alternative shopping options 156 to include in the subset 179. Upon identifying the subset 179, the recommendations analysis service 131 provides a response to the requesting network site 123 that includes the subset 179 of the alternative shopping options 156 to be presented to a customer in the network page 153. Thereafter, the network site 123 may serve up the network page 153 to the client 106 through the network server applications 133 once the network site 123 has completed generating the network page 153 by including all needed content or pointers to such content, including the alternative shopping options 156.

In one embodiment, the estimate of the benefit for each of the alternative shopping options 156 involves the determination of a probability that a customer will select the alternative shopping option 156 when viewing the network page 153. Also, the estimate of the benefit of an alternative shopping option 156 with respect to a network site 123 may be determined by identifying a probability that the selection of a given alternative shopping option 156 by a customer will result in conversion. To this end, conversion may comprise, for example, actions such as purchasing a product viewed, adding a product to a shopping cart, clicking through an advertisement or other reference, clicking through a link, or some other behavior. The probability of conversion may depend, for example, on customer satisfaction with a given network site 123 that may depend upon different factors such as the number of orders received, average sales price of items sold relative to current pricing, return rates for products, the past conversion rates of a given network site, reviews of products, reviews of merchants, and/or other factors.

In addition, in determining an estimate of a benefit of a given alternative shopping option 156, the recommendations analysis service 131 may determine at least an estimate of the profitability associated with each alternative shopping option 156. Given the above probabilities and the potential profitability of a given alternative shopping option 156, the ultimate benefit of a given alternative shopping option 156 with respect to a requesting network site 123 may be determined.

According to one embodiment, the recommendations analysis service 131 identifies the subset 179 of alternative shopping options 156 to be included in a network page 153 by identifying the subset 179 of alternative shopping options 156 having the highest estimate of benefits to the requesting network site 123 as described above. For example, the recommendations analysis service 131 may select the top 3 or top 5 alternative shopping options 156 to be included in a respective network page 153.

In addition, it may be the case that a requesting network site 123 may dictate the type of alternative shopping options 156 that are to be presented in the respective network page 153. For example, the network site 123 may indicate in its request that all of the alternative shopping options 156 are to present alternative products offered for sale by the requesting network site 123. Alternatively, the requesting network site 123 may indicate that a first portion of the alternative shopping options 156 should involve a reference or link to other network sites 123, and a second portion of the alternative shopping options 156 should present alternative products sold by the requesting network site 123 or other network sites 123. Thus, a given network site 123 may specify the precise makeup of the subset 179 of alternative shopping options 156 that are to be included in the network page 153 in the request to the recommendations analysis service 131.

For example, assume that a given network page 153 has room in which to present five alternative shopping options 156. It may be desired that three of such alternative shopping options 156 should present alternative products to a given product displayed by the network page 153 sold by the requesting network site 123 or other network sites 123. It may also be the case that the requesting network site 123 specifies that two of the alternative shopping options 156 to be presented comprise a reference to alternative network sites 123 rather than identifying specific products.

Upon receiving such a request, the recommendations analysis service 131 may identify the top three alternative shopping options 156 that comprise offers for products and it may identify the top two alternative shopping options 156 that involve referrals to other network sites 123. Ultimately, the subset 179 identified will include the five alternative shopping options 156 including the top three alternative products and the top two alternative network site 123 referrals. To this end, each network site 123 can control the makeup of the subset 179 of alternative shopping options 156 by indicating the types of alternative shopping options 156 desired in the request sent to the recommendations analysis service 131.

Upon receiving a given network page 153 that includes the alternative shopping options 156 in the client 106, the browser application 176 proceeds to render such network page 153 on a display device 173 of the client 106. While the browser application 176 is described as performing its function, it is understood that other applications may also perform a similar function as can be appreciated.

In addition, according to one embodiment, functionality of the recommendations service 126, network site relationship engine 129, and/or the recommendations analysis service 131 may be available to serve multiple network sites 123, or each may be associated with a single network site 123.

Figure 2:
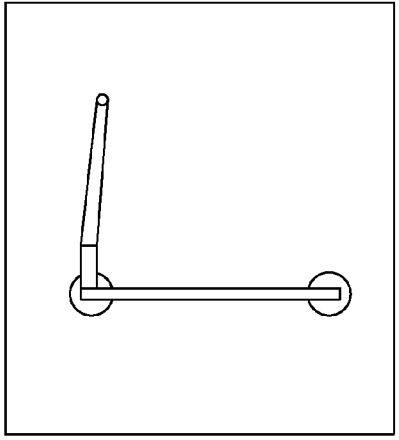
FIG. 2 is a drawing of one example of a network page generated by a network site implemented in a server in the data communications network of FIG. 1 according to an embodiment of the present disclosure.

With reference next to FIG. 2, shown is an example of a network page 153 denoted herein as network page 153a according to various embodiments. The network page 153a includes subject matter 203 that describes a product 206. To this end, the network page 153a may provide an example of a product detail network page 153 as described above. To this end, a description of the products 206 is provided. Also, an image of the product 206 and various components that facilitate a selection of the color or other attributes of the product 206 are displayed.

In addition, a portion of the network page 153a includes a listing of alternative shopping options 156. In FIG. 2, an example list of five different alternative shopping options 156 are shown, although there may be more or less alternative shopping options 156 associated with a given network page 153, where the limited number shown in FIG. 2 merely provides for one example. Alternatively, a larger list of alternative shopping options 156 may be presented, for example, with the use of scrolling with a box or other portion of the network page 153a.

Each of the alternative shopping options 156 relate to the subject matter 203 of the network page 153a. For example, given that the subject matter 203 of the network page 153a describes a product 206 such as a scooter as depicted, each of the alternative shopping options 156 are also related to scooters. Two of the alternative shopping options 156 directly comprise a link to a second network page 153 that is generated by an alternative one of the network sites 123 (FIG. 1).

To this end, the text or image associated with the respective alternative shopping options 156 that refer to other network sites 123 may comprise a link that can be clicked by a customer. When this is done, the network page 153a may include the functionality associated with such links to provide information about the subject matter 203 such as the name of the product 206 to the subsequent network site 123. This may be done so that the subsequent network site 123 can automatically do a search based upon such subject matter 203 to generate a landing network page 153 that shows the product 206 or shows other related products 206 as can be appreciated. Thus, subsequent network pages 153 generated based upon clicking on one of the alternative shopping options 156 directing the user to a second network site 123 may result in the generation of a second network page 153 that offers one or more products 206 for purchase through the second one of the network sites 123 generating the second network page 153. Note that a landing network page 153 from a second network site 123 to which one may be directed by an alternative shopping option 156 may also present several alternative shopping options 156. In this respect, the network sites 123 make up a community that is supportive of one another in helping consumers find the most relevant shopping option based on the specific items they desire.

In addition, various ones of the alternative shopping options 156 may present offers for alternative products 206 for purchase through the network site 123 that generated the network page 153 or that may be purchased through other network sites 123 as mentioned above.

Figure 3:
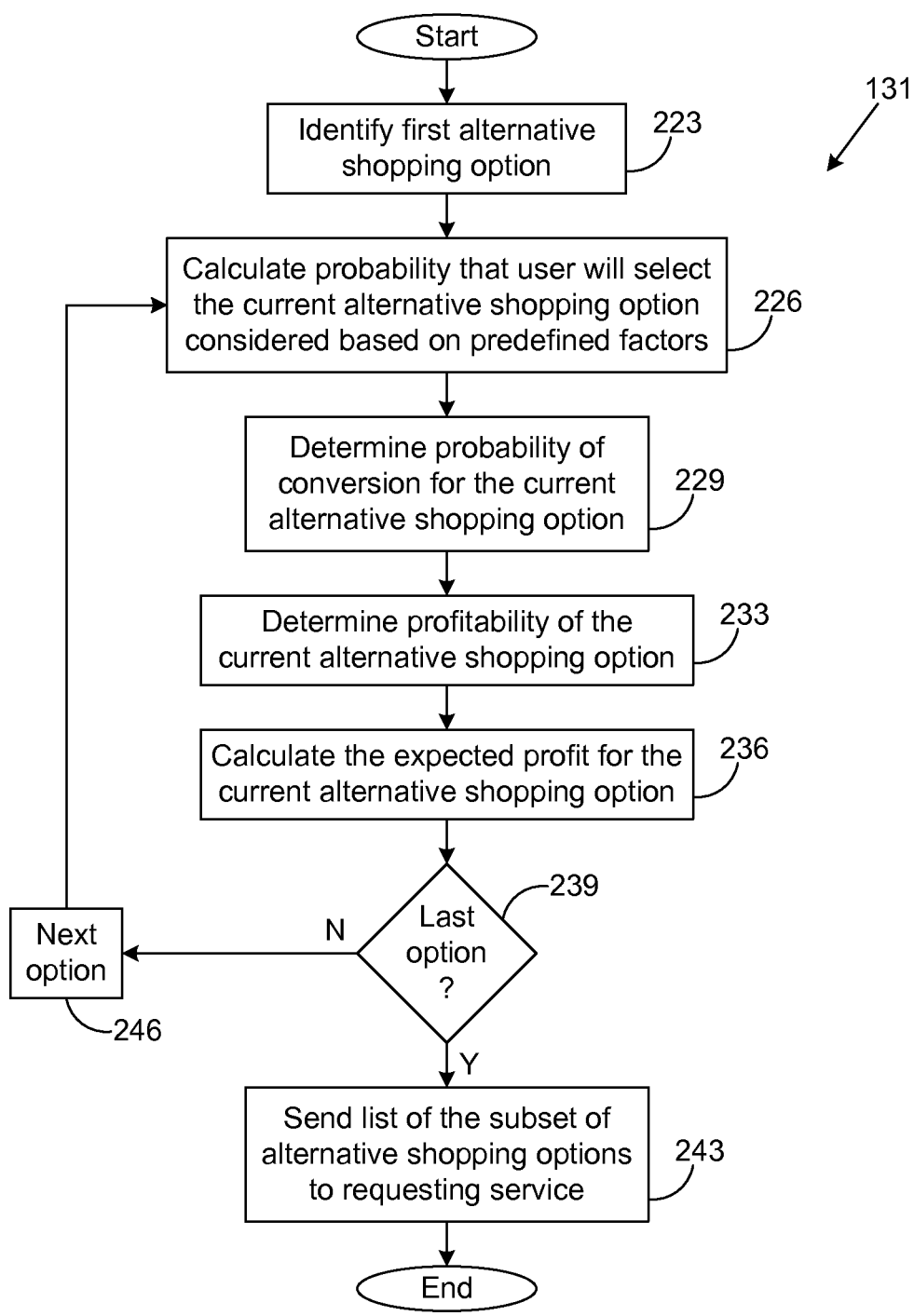
FIG. 3 is a flowchart that provides on example of functionality of a service implemented in a server in the data communications network of FIG. 1 according to an embodiment of the present disclosure.

With reference next to FIG. 3, shown is a flowchart that provides one example of functionality of the recommendations analysis service 131 in identifying the subset 179 (FIG. 1) of the potential alternative shopping options 156 (FIG. 1) that may be included within a given network page 153 (FIG. 1) as described above. Alternatively, the flowchart of FIG. 3 may be viewed as depicting steps of a method in the server 103 (FIG. 1) according to various embodiments. It is assumed that a requesting one of the network sites 123 has provided the total number of the various types of alternative shopping options 156 desired for a given network page 153 in the request sent that is received by the recommendations analysis service 131.

To begin, in box 223, a first alternative shopping option 156 among those received from a requesting network site 123 is designated for scrutiny. Thereafter, in box 226, the probability is calculated that a customer will select the respective alternative shopping option 156 based upon predefined factors. Such factors may comprise, for example, the location of the alternative shopping option 156 relative to other content in the network page 153, the probability that the user will select the alternative shopping option 156 based upon the current subject matter 203 viewed in the network page 153, any known relationships between the subject of the alternative shopping option 156 and the subject matter 203 of the network page 153, or other factors as can be appreciated. In one embodiment, such information may be generated over time based upon the behavior of customers upon viewing the respective alternative shopping options 156 as can be appreciated.

In addition, the recommendations analysis service 131 may examine the customer data 146 associated with a user to generate a probability that they will select the current alternative shopping option 156 in lieu of their past purchase history data 166 (FIG. 1) and browse history data 169 (FIG. 1). In addition, other factors may be examined as can be appreciated.

Once the probability that a user will select a current alternative shopping option 156 is determined in box 226, then in box 229 the recommendations analysis service 131 determines the probability that a given alternative shopping option 156 may result in conversion. To this end, the recommendations analysis service 131 may examine various factors such as the customer data 146 associated with the respective customer, conversion rates of network sites 123, and other data as can be appreciated. For example, the customer data 146 may indicate a rate of conversion for the respective customer or for all customers in general. If the alternative shopping option 156 is a link to another network site 123, then the conversion rate of such network site 123 for the products 206 associated with the subject matter 203 or for all products 206 may be taken into account.

Then, in box 233, the recommendations analysis service 131 identifies the profitability associated with the current alternative shopping option 156 relative to the requesting one of the network sites 123. To this end, if a given product 206 that is the subject of the current alternative shopping option 156 is sold by the requesting network site 123, then the profitability would be the profit of that network site 123 for the sale of such product 206. Alternatively, if the alternative shopping option 156 presents a product 206 sold by another network site 123, where the requesting network site 123 stands to receive a referral fee or commission, then the referral or commission is taken as the profitability for the requesting network site 123. In addition, where an alternative shopping option 156 comprises a referral or link to another network site 123, the probability that the user will select products 206 on such alternative network site 123 may be determined based upon, for example, the average profitability of such network site 123 for a product 206 similar in scope to the product 206 that is the subject matter 203 of the current network page 153. Alternatively, the potential profitability of such an alternative shopping option 156 may be determined in other ways.

Thereafter, in box 236, the expected profit for the current alternative shopping option 156 is calculated as follows:

$$E=(P_s)(P_C)(R),$$

where $P_S$ is the probability that a customer will select the alternative shopping option 156, $P_C$ is the probability of conversion for the alternative shopping option 156, and R is the estimated or exact profit expected if a purchase results.

Thereafter, in box 239, the recommendations analysis service 131 determines whether the current alternative shopping option 156 is the last option to be considered among those identified by the requesting network site 123. If so, then the recommendations analysis service 131 proceeds to box 243. Otherwise, the recommendations analysis service 131 progresses to box 246.

In box 246, the recommendations analysis service 131 identifies the next alternative shopping option 156 for consideration and reverts back to box 226 as shown. In box 243, a list of the subset 179 of alternative shopping options 156 is sent back to the requesting network site 123 so that such alternative shopping options 156 may be included in the network page 153. According to one embodiment, such a list includes the total number of the various types of alternative shopping options 156 as was requested by the requesting network site 123. For example, the list may include the top X alternative shopping options 156 that have the highest potential profitability as can be appreciated.

Figure 4:
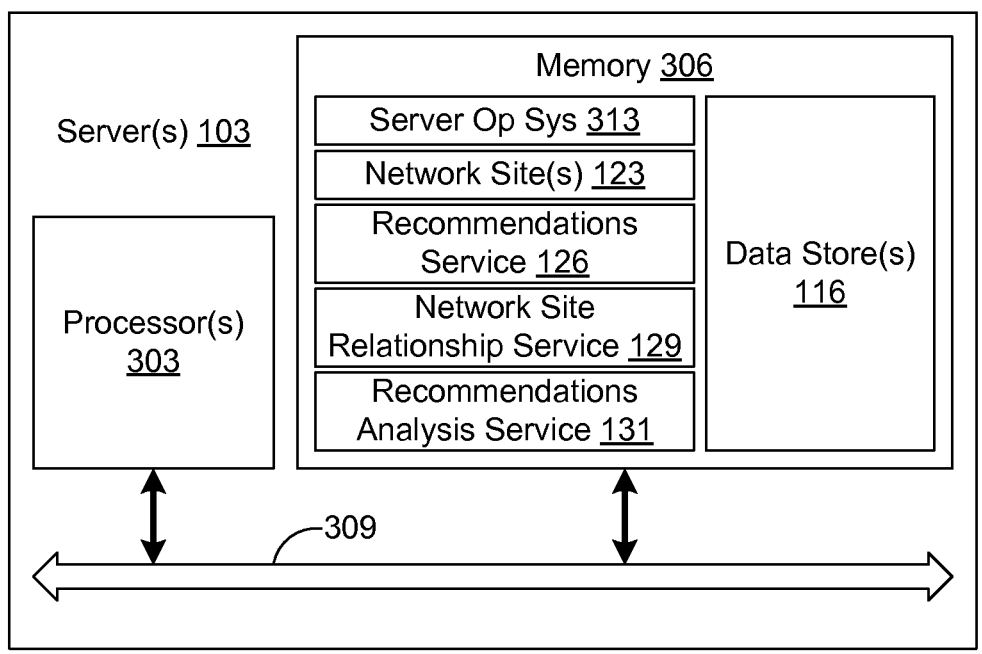
FIG. 4 is a schematic block diagram that illustrates one example of a server employed in the data communications network of FIG. 1 according to an embodiment of the present disclosure.

Referring next to FIG. 4, shown is a schematic block diagram of one example of the server 103 according to an embodiment of the present disclosure. The server 103 includes at least one processor circuit, for example, having a processor 303 and a memory 306, both of which are coupled to a local interface 309. To this end, the server 103 may comprise, for example, a server computer or like device. The local interface 309 may comprise, for example, a data bus with an accompanying address/control bus or other bus structure as can be appreciated.

Stored in the memory 306 are both data and several components and/or applications that are executable by the processor 303. In particular, stored in the memory 306 and executable by the processor 303 are a server operating system 313, the one or more network sites 123, the recommendations service 126, the network site relationship service 129, the recommendations analysis service 131, and potentially other applications such as electronic commerce applications, etc.

Also, stored in the memory 306 is the data store 116 in which are stored the various data items described above so as to be accessible to the processor 303. It is understood that other data may be stored in the memory 306 and accessed by the processors 303 beyond the data described above.

A number of software components are stored in the memory 306 and are executable or executed by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 303 may represent multiple processors and the memory 306 may represent multiple memories that operate in parallel. In such a case, the local interface 309 may be an appropriate network that facilitates communication between any two of the multiple processors, between any processor and any one of the memories, or between any two of the memories etc. The local interface 309 may comprise additional systems designed to coordinate this communication, including, for example, performing load balancing. The processor 303 may be of electrical or of some other available construction.

The various applications or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as the network sites 123, the recommendations service 126, the network site relationship service 129, and the recommendations analysis service 131 described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of the various applications and/or other components such as the recommendations analysis service 131 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications and/or other components described herein such as the recommendations analysis service 131 comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing a program executable in a computing device, the program comprising:
   code that identifies a collection of alternative shopping options based upon a subject matter of at least one network page to be presented to a user, the at least one network page being generated by a first network site, and wherein at least one of the alternative shopping options comprises a purchase opportunity associated with a second network site;
   code that determines a plurality of estimates of benefit with respect to the first network site based at least in part on a probability that a respective one of the alternative shopping options will be selected by the user and a profitability of the respective one of the alternative shopping options;
   code that determines a subset of the alternative shopping options to be included in the at least one network page based at least upon the plurality of estimates of benefit, wherein at least one of the alternative shopping options in the subset comprises a purchase opportunity to be consummated through the second network site; and
   code that includes the subset of the alternative shopping options in the at least one network page.

2. The non-transitory computer-readable medium of claim 1, wherein the at least one network page comprises a first network page, and at least one of the alternative shopping options further comprises a link in the first network page to a second network page generated by the second network site.

3. The non-transitory computer-readable medium of claim 1, wherein the subset of the alternative shopping options to be included in the network page is determined by identifying those of the alternative shopping options having a respective one of the estimates of benefit meeting a threshold.

4. A method, comprising:
   identifying, by a computing device, a collection of alternative shopping options based upon subject matter of a network page to be rendered for display by a client device associated with a user, the network page being generated by a first network site, at least one of the alternative shopping options comprising a purchase opportunity to be consummated through a second network site;
   determining, by the computing device, a plurality of estimates of benefit with respect to the first network site based at least in part on a probability that a respective one of the alternative shopping options will be selected by the user and a probability that a selection of the respective one of the alternative shopping options by the user will result in conversion;
   determining, by the computing device, a subset of the alternative shopping options to be included in the network page based at least upon the plurality of estimates of benefit; and
   including, by the computing device, the subset of the alternative shopping options in the network page to be rendered for display by the client device associated with the user.

5. The method of claim 4, further wherein determining the subset of the alternative shopping options to be included in the network page comprises:
   determining, by the computing device, a first portion of the subset of the alternative shopping options to be consummated through the first network site; and
   determining, by the computing device, a second portion of the subset of the alternative shopping options to be consummated through the second network site.

6. The method of claim 4, wherein the probability that the selection of the respective one of the alternative shopping options by the user will result in conversion is based at least in part on a user satisfaction with respect to the first network site or the second network site, a review of an item, a review of a merchant, or a past conversion rate.

7. The method of claim 4, further comprising communicating, by the computing device, the network page to the client device via a network.

8. The method of claim 4, wherein determining, by the computing device, the subset of the alternative shopping options to be included in the network page based at least upon the plurality of estimates of benefit further comprises identifying those of the alternative shopping options having a respective one of the estimates of benefit meeting a threshold.

9. The method of claim 4, wherein the network page comprises a first network page, and the at least one of the alternative shopping options further comprises a link in the first network page to a second network page generated by the second network site.

10. The method of claim 9, wherein the second network page offers an item for purchase through the second network sites.

11. The method of claim 6, wherein the at least one of the alternative shopping options offers an item for purchase through the first one of the network sites.

12. The method of claim 6, wherein identifying the collection of alternative shopping options is further based at least in part on a browsing activity of the user comprising contemporaneous activity with respect to the first network site and the second network site.

13. The method of claim 6, wherein the second network site is targeted to an item category associated with the at least one of the alternative shopping options.

14. A system, comprising:
   at least one computing device; and
   an application executable in the at least one computing device, comprising:
      logic that identifies a collection of alternative shopping options based upon a subject matter of a network page to be rendered for display by a client device, the network page being generated by a first network site;
      logic that determines a plurality of estimates of benefit with respect to the first network site based at least in part on a probability that a selection of a respective one of the alternative shopping options by a user associated with the client device will result in conversion and a profitability of the respective one of the alternative shopping options; and
      logic that determines a subset of the alternative shopping options to be included in the network page based at least upon the plurality of estimates of benefit, wherein at least one of the alternative shopping options in the subset comprises a purchase opportunity to be consummated through a second network site.

15. The system of claim 14, wherein the profitability is based at least in part on a commission payment or a profit margin.

16. The system of claim 14, wherein the subset of the alternative shopping options to be included in the network page is determined by identifying those of the alternative shopping options having a respective one of the estimates of benefit meeting a threshold.

17. The system of claim 14, wherein the collection of alternative shopping options is based at least in part on site relationship data associated with the first network site.

18. The system of claim 17, wherein the application further comprises logic that loads the site relationship data from a data store in response to a request for the network page.

19. The system of claim 17, wherein the application further comprises logic that generates the site relationship data in response to a request for the network page.

20. The system of claim 17, wherein the application further comprises logic that encodes a relationship between the first network site and the second network site in the site relationship data in response to a number of users having performed a browsing activity with respect to the first network site and the second network site meeting a threshold.

* * * * *